United States Patent [19]
Eckberg et al.

[11] Patent Number: 5,969,901
[45] Date of Patent: Oct. 19, 1999

[54] GASKET FRAME FOR GROUNDING AN ACTUATOR FLEX CABLE IN A DISC DRIVE

[75] Inventors: Eric Alan Eckberg, Rochester; Dale Ernest Goodman, Oronoco, both of Minn.; Steven Alf Hanssen; Kirk Barrows Price, both of San Jose, Calif.

[73] Assignee: International Business Machines Corporation, Armonk, N.Y.

[21] Appl. No.: 08/904,030

[22] Filed: Jul. 31, 1997

Related U.S. Application Data

[63] Continuation of application No. 08/904,030, Jul. 31, 1997.

[51] Int. Cl.[6] ................................................. G11B 5/012
[52] U.S. Cl. ....................................................... 360/97.01
[58] Field of Search ........................... 174/35 C, 35 GC, 174/35 R, 35 MS; 439/92, 95, 96, 101, 108, 271, 927; 361/753, 818; 413/9; 360/97.01, 97.02

[56] References Cited

U.S. PATENT DOCUMENTS

| | | | |
|---|---|---|---|
| 5,187,621 | 2/1993 | Tacklind | 360/97.02 |
| 5,317,105 | 5/1994 | Weber | 174/35 |
| 5,337,202 | 8/1994 | Jabbarai et al. | 360/97.01 |
| 5,357,386 | 10/1994 | Haidari et al. | 360/97.02 |
| 5,454,157 | 10/1995 | Ananth et al. | 29/603 |
| 5,495,377 | 2/1996 | Kim | 360/106 |
| 5,499,161 | 3/1996 | Hosseinzadeh et al. | 361/749 |
| 5,541,787 | 7/1996 | Jabbari et al. | 360/97.01 |
| 5,543,982 | 8/1996 | Takagi et al. | 360/97.01 |
| 5,656,795 | 8/1997 | Miska | 174/35 |

FOREIGN PATENT DOCUMENTS 7-14359  1/1995  Japan .

OTHER PUBLICATIONS

"Grounding Contact Structure for a Flexible Printed Circuit", IBM Technical Disclosure Bulletin, vol. 37 No. 05, May 1994, pp. 167–168.

"Flex Cable Ground Spring", IBM Technical Disclosure Bulletin, vol. 38 No. 02, Feb. 1995, p. 3.

Primary Examiner—George J. Letscher
Attorney, Agent, or Firm—Noreen A. Krall

[57] ABSTRACT

A gasket for a disk drive system that seals the connector port for the actuator flex cable to the disk drive housing which is designed to also provide electrical ground contact from the disk drive housing to the actuator flex cable ground lead. In accordance with the new gasket disclosed herein, grounding of the actuator flex cable ground lead to the disk drive housing is accomplished without need of additional fasteners, or additional process steps in assembly of the disk drive.

9 Claims, 4 Drawing Sheets

GASKET FRAME FOR GROUNDING AN ACTUATOR FLEX CABLE IN A DISC DRIVE

CROSS REFERENCE TO RELATED APPLICATIONS

The present application is a continuation of application Ser. No. 08/904,030 filed Jul. 31, 1997, pending.

BACKGROUND OF THE INVENTION

1. Field of the Invention This invention relates in general to disk drives, and in particular to a gasket frame for grounding an actuator flex cable and method of using the same, wherein the actuator flex cable gasket grounds the actuator flex cable to the disk drive casting.

2. Description of Related Art

Moving magnetic storage devices, especially magnetic disk drives, are the memory devices of choice. This is due to their expanded non-volatile memory storage capability combined with a relatively low cost.

Magnetic disk drives are information storage devices which utilize at least one rotatable magnetic media disk having concentric data tracks defined for storing data, a magnetic recording head or transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air-bearing, generated by the rotating disk.

Alternatively, the transducer may operate in contact with the surface of the disk. Thus, the suspension provides desired slider loading and dimensional stability between the slider and an actuator arm which couples the transducer/slider/suspension assembly to the actuator. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. The actuator may include a single arm extending from a pivot point, or alternatively a plurality of arms arranged in a comb-like fashion extending from a pivot point. A rotary voice coil motor (vcm) is attached to the rear portion of the actuator arm or arms to power movement of the actuator over the disks.

The vcm located at the rear portion of the actuator arm is comprised of a top plate spaced above a bottom plate with a magnet or pair of magnets therebetween. The vcm further includes an electrically conductive coil disposed within the rearward extension of the actuator arm and between the top and bottom plates, while overlying the magnet in a plane parallel to the magnet. In operation, current passes through the coil and interacts with the magnetic field of the magnet so as to rotate the actuator arm around its pivot and thus positioning the transducer as desired.

The magnetic media disk or disks in the disk drive are mounted to a spindle. The spindle is attached to a spindle motor which rotates the spindle and the disks to provide read/write access to the various portions on the concentric tracks on the disks.

One or more electrical conductors extend over the suspension assembly to electrically connect the read/write transducer to a read/write chip on the actuator arm. A multiline flexible printed circuit cable (actuator flex cable) provides the electrical contact between the read/write chip and the disk drive electronics which are mounted outside the disk drive housing. Inside the disk drive housing, the actuator flex cable connects to an electrical connector pin assembly, which in turn, through an opening or connector port in the housing, connects to the external electronics. An electrical ground line is one of the electrical connections on the actuator flex cable. This ground line provides a good electrical connection between the read/write chip electrical ground and the disk drive housing. Electrical grounding is increasingly important in disk drive systems to decrease electrical noise affecting the data signal and to minimize electrostatic charge buildup which can result in damage to the read/write transducer.

When considering methods to connect the electronics inside the disk drive housing with the external disk drive electronics, it must be considered that disk drive systems are very sensitive to particulate and chemical contamination which can adversely affect the mechanical reliability. To protect the system from contamination, disk drive housings are generally sealed to isolate the interior of the disk drive from the outside environment. The actuator flex cable connecting the read/write chip and the disk drive electronics is electrically connected to a sealed connector pin assembly which is mounted at the connector port with a suitable gasket seal interface to the disk drive housing. On the inside of the disk drive housing, grounding of the actuator flex cable at the connector port is very important to improve signal-to-noise ratio during use of the drive and to protect the electronics and read/write transducer from electrostatic damage during assembly and handling.

In the prior art, electrical connection of the actuator flex cable ground line to the disk drive housing is made with a variety of mechanical connectors such a screws, springs, pins or other fastening devices. For example, in U.S. Pat. No. 5,541,787 assigned to Jabbari et al., grounding of the actuator flex cable to the disk drive housing by means of screws is described. A second example is the IBM Technical Disclosure Bulletin, Vol. 38, No. 02, February 1995, describing a spring soldered to the actuator flex cable ground which contacts the disk drive housing when the drive is assembled. The disadvantages of the prior art methods for providing actuator flex cable grounding are the need for extra components, the added assembly steps required and the risk of introducing contamination inside the disk drive housing.

It therefore can be seen that there is a need for an apparatus and a method for grounding the actuator flex cable to the disk drive housing which provides a reliable electrical ground contact with no additional parts or assembly steps and no sources of additional particulate contamination.

SUMMARY OF THE INVENTION

To overcome the shortcomings of the prior art described above, it therefore is the object of the present invention to disclose an apparatus and method of grounding the actuator flex cable to the disk drive housing in a disk drive system that eliminates the need for using screws, nuts, pins, springs or other fasteners for the ground connection.

It is also the object of the present invention to disclose a magnetic disk drive having a gasket seal at the connector port for the actuator electronics which provides grounding of the actuator flex cable to the disk drive housing.

It is a further object of the present invention to disclose a gasket design that provides grounding of the actuator flex cable to the disk drive housing as the gasket is compressed during assembly of the disk drive.

Briefly stated, the preferred embodiment of the present invention is a gasket that seals the connector port of the actuator flex cable to the disk drive housing which is designed to also provide electrical ground contact from the disk drive housing to the actuator flex cable ground lead. With the new gasket, grounding of the actuator flex cable ground lead to the disk drive housing is accomplished during the normal gasket installation process without need of additional fasteners or additional process steps in assembly of the disk drive. Elimination of the need for a screw or other grounding hardware also reduces the risk of disk drive particulate contamination during assembly.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3a is a plan view of the gasket for the actuator electronics connector port in the disk drive housing, while

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
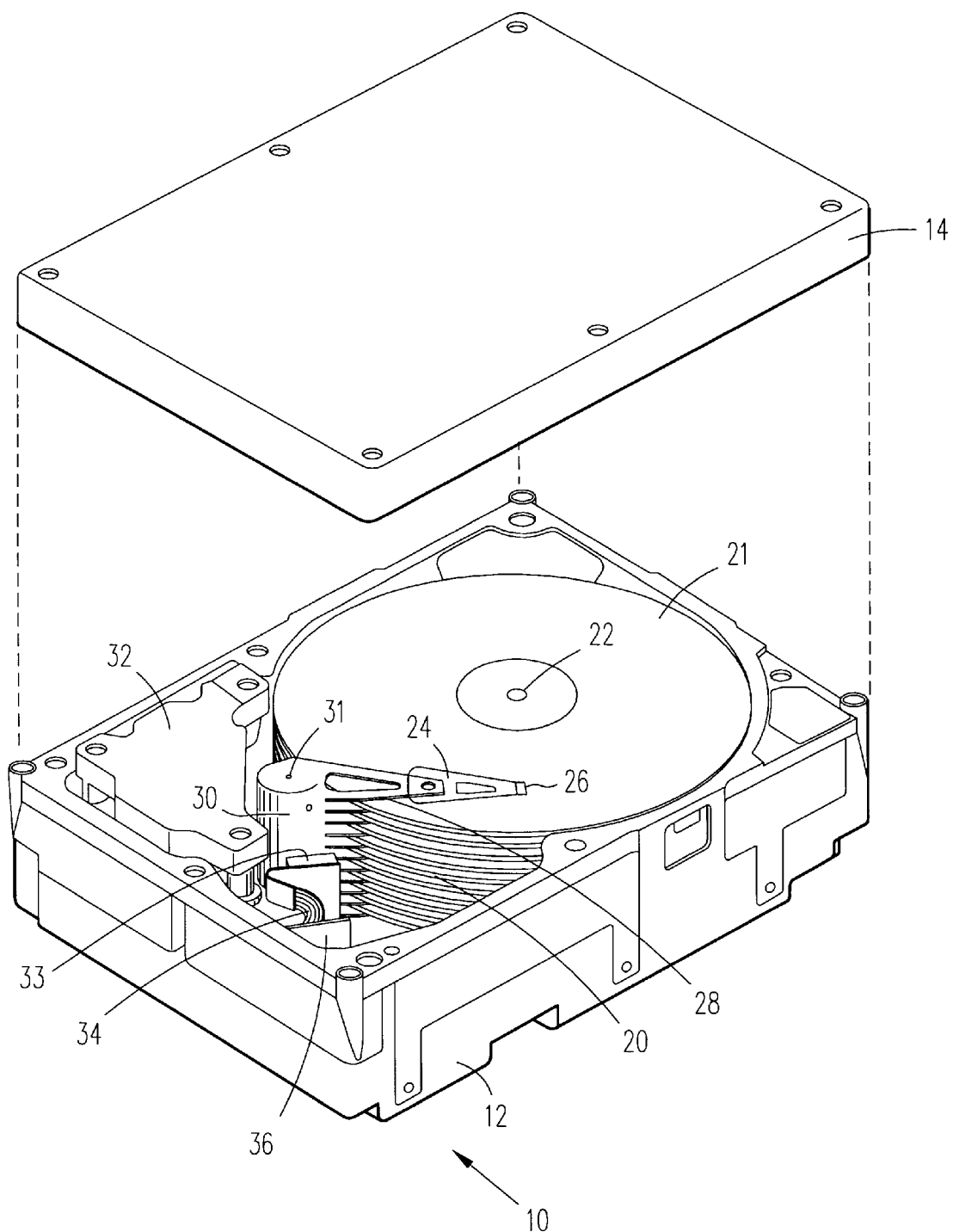
FIG. 1 is a plan view of the disk drive of the present invention illustrating the relative placement of the components.

FIG. 1 shows a disk drive system designated by the general reference number 10. The lid 14 of the disk drive is shown exploded. In operation, the lid would be disposed on top of the housing 12.

The disk drive comprises one or more magnetic disks 21. The disks 21 may be conventional particulate or thin film recording disks, which are capable of storing digital data in concentric tracks. In a preferred embodiment, both sides of the disks 21 are available for storage, and it will be recognized by one of ordinary skill in the art that the disk drive 10 may include any number of such disks 21.

The disks 21 are mounted to a spindle 22. The spindle 22 is attached to a spindle motor which rotates the spindle 22 and the disks 21 to provide read/write access to the various portions of the concentric tracks on the disks 21.

An actuator assembly 30 includes a positioner arm 28, and a suspension assembly 24. The suspension assembly 24 includes a slider/transducer assembly 26 at its distal end. Although only one slider/transducer assembly 26 of the suspension assembly 24 is shown, it will be recognized that the disk drive 10 has one slider/transducer assembly 26 for each side of each disk 21 included in the drive 10. The positioner arm 28 further comprises a pivot 31 around which the positioner arm 28 pivots.

The disk drive 10 further includes a amplifier chip 33. As is well known in the art, the amplifier chip 33 cooperates with the slider/transducer assembly on the slider assembly 26 to read data from or write data to the disks 21. A flexible printed circuit member or actuator flex cable 34 carries signals between the amplifier chip 33 and a connector pin assembly (not shown) which interfaces with the external signal processing electronics. The actuator flex cable 34 leading from the amplifier chip 33 is attached to a flex cable bracket 36 which directs the actuator flex cable 34 to a connector port for connection to the connector pin assembly.

The main function of the actuator assembly 30 is to move the positioner or actuator arm 28 around the pivot 31. Part of the actuator assembly 30 is the voice coil motor (vcm) assembly 32 which comprises a vcm bottom plate, a magnet and a vcm top plate in combination with an actuator coil. Current passing through the actuator coil interacts with the magnetic field of the magnet to rotate the positioner arm 28 and suspension assembly 24 around the pivot 31, thus positioning the transducer/suspension assembly as desired.

Figure 2:
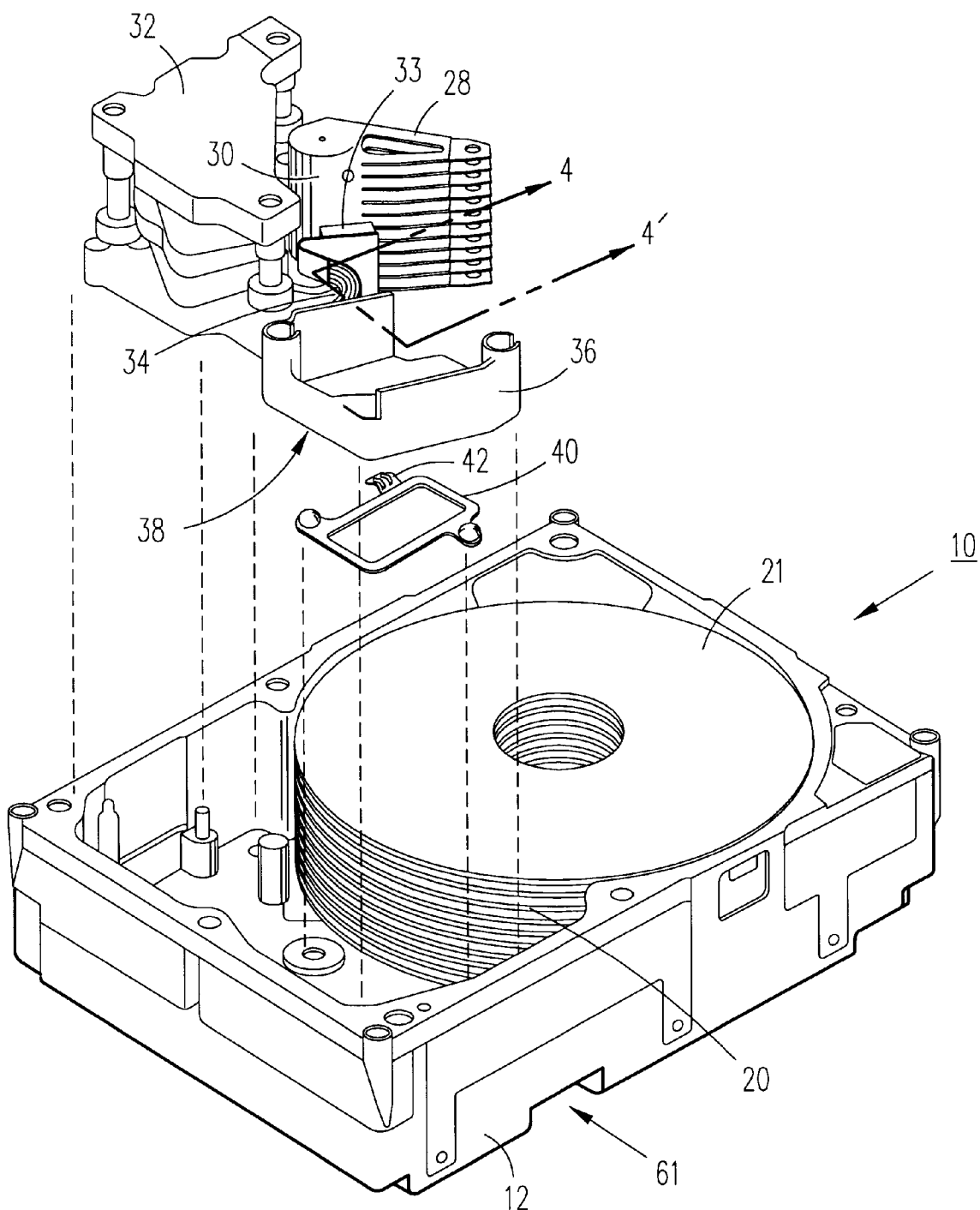
FIG. 2 is an exploded plan view of the disk drive of the present invention illustrating the relative placement of components including the flex cable bracket and the gasket seal for the actuator electronics connector port in the disk drive housing.

FIG. 2 is a plan view of the disk drive system 10 in which the actuator assembly 30 and the seal gasket 40 are shown exploded. The actuator flex cable 34 is connected to and extends from the amplifier chip 33 to the flex cable bracket 36. The actuator flex cable 34 is attached to the flex cable bracket 36 which guides the actuator flex cable 34 under the flex cable bracket bottom surface 38 to the disk drive housing connector port for the connector pin assembly 62. The connector port 61 and connector pin assembly 62 will be shown and described in detail in connection with FIG. 4. Still with reference to FIG. 2, the gasket 40 lies between the actuator flex cable 34 and the disk drive housing 12 providing a seal around the connector port 61 for the connector pin assembly 62. The flex cable bracket 36 is fixed to the disk drive housing 12 at disk drive assembly so that the flex cable bracket bottom surface 38 clamps the actuator flex cable 36 and gasket 40 to the disk drive housing 12.

Figure 3A:
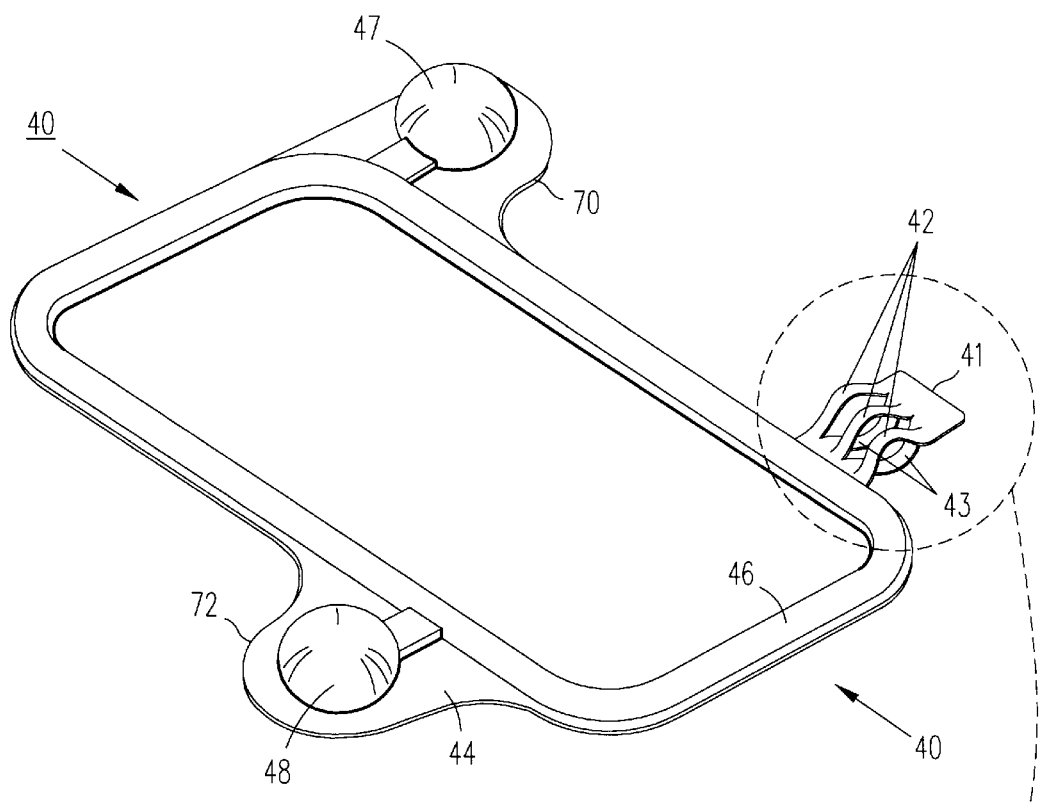

FIG. 3a is a plan view of the gasket 40 of the present invention. The seal gasket design comprises a thin stainless steel or other suitable metal liner 44 cut to the desired shape on which is molded a flexible seal 46 on both the upper and the lower surfaces of the liner 44. Raised alignment features 47 and 48 of the same flexible seal material are also formed on alignment tabs 70,72, the upper surface of the liner 44 in the same molding process. In a preferred embodiment, the flexible seal material is a fluorocarbon rubber material which is known to provide a good seal to isolate the inside of the disk drive system 10 from chemical and particulate contaminants in the outside environment.

Figure 3B:
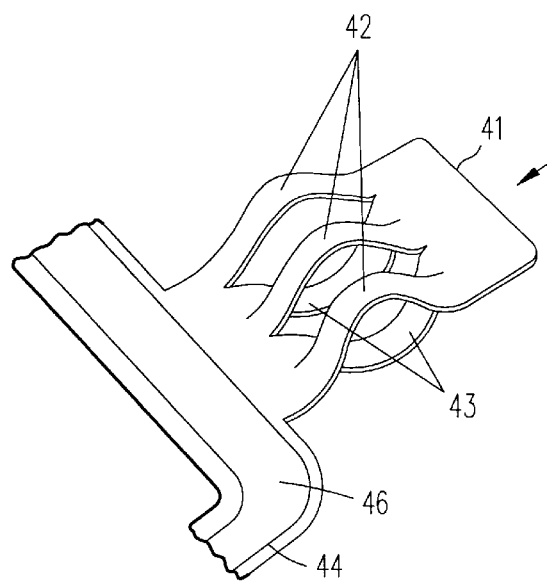
FIG. 3b is an enlarged plan view of the gasket contact tab.

Still with reference to FIG. 3a, it is seen that the gasket 40 of the present invention is further comprised of a grounding tab 41. The grounding tab 41 is integrally formed with the metal liner 44 and further comprises shaped contact strips 42 and 43 that extend above and below the rubber flexible seal 46. With reference to FIG. 3b, when the disk drive 10 is assembled, the upward extending contact strips 42 contact the ground lead in the actuator flex cable 34 and the downward extending contact strips 43 contact the disk drive housing 12. These contacts are described in more detail below.

In one embodiment, the gasket 40 of the present invention used in the IBM 3.5" disk drives, the following dimensions and compositions were found to be optimum. The length and width of the metal liner 44 were 30 mm and 16.6 mm respectively. The metal liner 44 was stainless steel 0.13 mm thick. The flexible seal 46 material was a fluorocarbon rubber extending approximately 0.6 mm above and below the upper and lower surfaces of the metal liner 44. The alignment features 47 and 48 were 3.9 mm in diameter and extended 1.1 mm above the upper surface of the metal liner 44. The grounding tab 41 was 4.5 mm wide and extended 5.0 mm outward from the metal liner 44 width. The contact strips 42 and 43 on the grounding tab 41 extended 0.75 mm upward and 0.75 mm downward from the upper and lower surfaces respectively of the metal liner 44. It is understood that these dimensions are illustrative of one embodiment and can be changed by different disk drive requirements.

Figure 4:
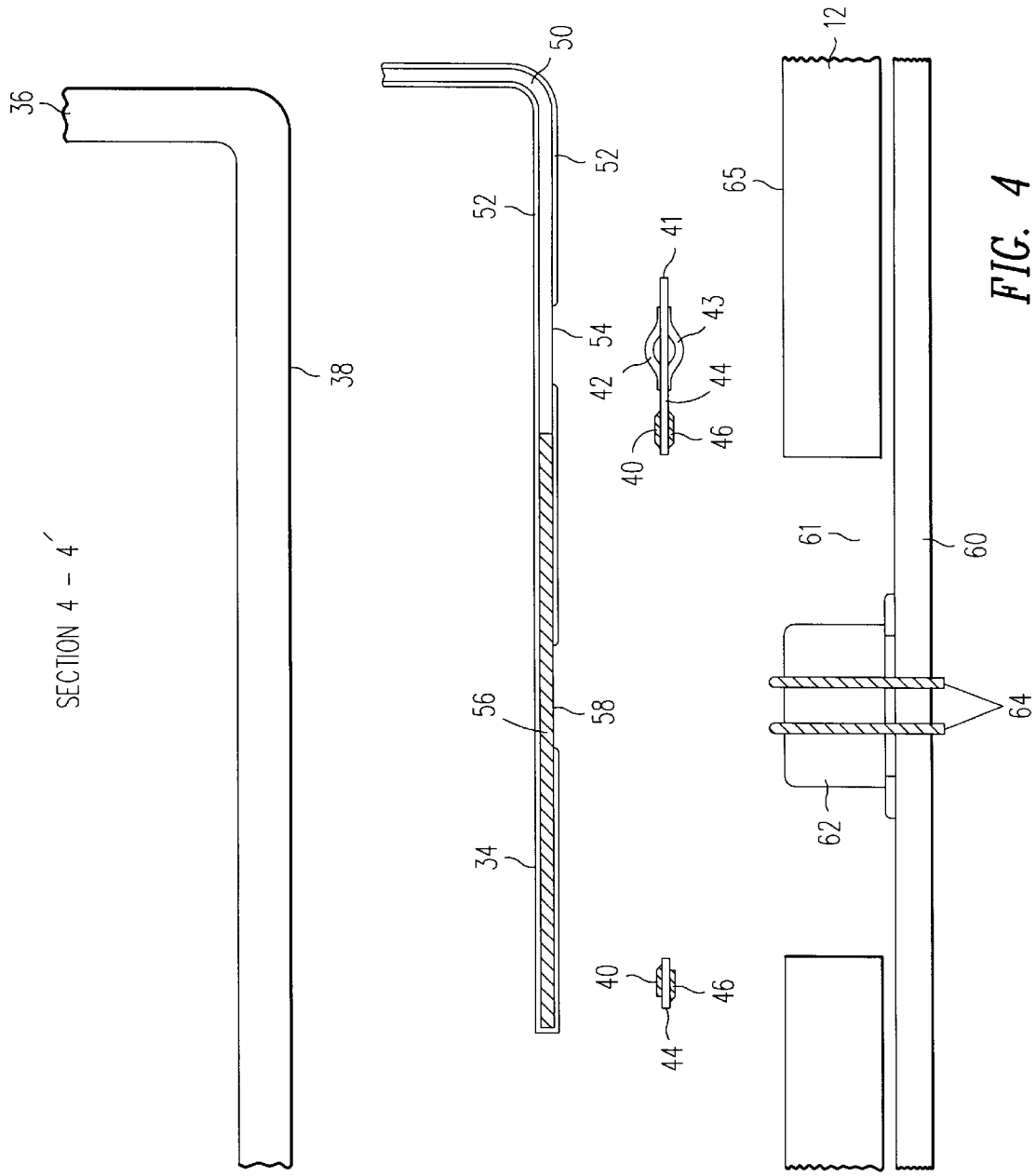
FIG. 4 is a exploded cross-sectional view of the flex cable bracket, actuator flex cable, connector port in the disk drive housing, and connector pin assembly taken along lines 4-4' of FIG. 2.

FIG. 4 shows a cross-section of the disk drive housing connector port area 61 exploded to illustrate the positioning and assembly of the flex cable bracket 36, the actuator flex cable 34, the seal gasket 40, and the disk drive housing 12 to provide the grounding of the present invention. The actuator flex cable 34 comprises top and bottom layers 52 of insulating plastic material supporting and enclosing a pattern of conducting leads 56 and a ground lead 50 formed of a conducting metal film, usually copper. During assembly of the disk drive 10, the actuator flex cable 34 is guided under the lower surface 38 of the flex cable bracket 36. The gasket 40 is aligned over the connector port 61 in the disk drive housing 12. The flex cable bracket 36 and the actuator flex cable 34 are aligned over seal gasket 40 so that an aperture 54 in the flex cable insulating material 52 is aligned with the upper contact strip 42 of the grounding tab 41 on the gasket 40. Alignment of the flex cable bracket 36, the actuator flex cable 34, the gasket 40 and the disk drive housing 12 are accomplished by means of suitable alignment studs. As the disk drive 10 is assembled, the flex cable bracket 36 is fastened to the disk drive housing 12, compressing the gasket 40 between the actuator flex cable 34 and the disk drive housing 12. The upper contact strip 42 on the gasket 40 contacts the flex cable ground 50 through the aperture 54 and the lower contact strip 43 contacts the disk drive housing surface 65. As the seal gasket 40 is compressed, the contact strips 42 and 43 deform in a manner to form excellent electrical grounding contact between the flex cable ground lead 50 and the disk drive housing surface 65.

In the assembled state, the flexible seal 46 and metal liner 44 are held in constant compression by the flex cable bracket assembly 36. The gasket liner grounding tab 41 has a restoring force that maintains sufficient contact between the flex cable 34 and the disk drive housing 12, which in turn preserves the low resistance electrical grounding path for noise improvement and electrostatic discharge protection to the actuator before the electronics card is assembled to the disk drive housing 12.

In FIG. 4, the electronics card 60 with the connector pin assembly 62 attached is shown for reference only. When the electronics card 60 is installed, connectors 64 in the connector pin assembly 62 contact the multiple electrical leads 56 through a suitable aperture or apertures 58 in the actuator flex cable insulation.

Assembly of the disk drive 10 with the actuator flex cable grounding feature of the present invention requires no special or additional steps compared to assembly of a file with a non-grounding seal gasket. The process of fastening the flex cable bracket 36 to the disk drive housing 12 requires compression of the flexible seal material 46 to provide isolation of the disk drive interior from the outside air. With the present invention, this same fastening process also compresses the contact strips 42 and 43.

While the preferred embodiment of the present invention has been illustrated herein in detail, it should be apparent that modifications and adaptations to this embodiment may occur to those skilled in the art without departing from the spirit, scope and teachings of the present invention as set forth in the following claims.

Accordingly, it is to be understood that the invention disclosed herein is not to be limited by the illustrated embodiment, but only by the scope of the appended claims.

We claim:

1. A grounding gasket for an actuator flex cable in a disk drive system comprising:

a liner having an upper and a lower side;

a first flexible seal overlying the upper side of the liner so as to form a continuous seal about the upper side of the liner;

a grounding tab integrally formed with and extending from the liner outside the periphery of the continuous first flexible seal, the grounding tab further comprised of a first contact strip extending above and perpendicular to the liner and higher than the first flexible seal on the liner, and a second contact strip extending below and perpendicular to the liner, wherein said grounding gasket is installable into the disk drive system as a single unitary piece.

2. The grounding gasket as claimed in claim 1, further comprising a second flexible seal overlying the lower side of the liner so as to form a continuous seal about the lower side of the liner.

3. The grounding gasket as claimed in claim 2, wherein the second contact strip extends below the plane of the second flexible seal.

4. The grounding gasket as claimed in claim 3, further comprising a pair of alignment tabs extended from said liner.

5. The grounding gasket as claimed in claim 4, further comprising raised alignment features disposed on said alignment tabs.

6. The grounding gasket as claimed in claim 5, wherein said liner is comprised of a conducting material.

7. The grounding gasket as claimed in claim 6, wherein said liner is comprised of stainless steel.

8. The grounding gasket as claimed in claim 6, wherein said first and second seals are comprised of a flexible dielectric insulating material.

9. The grounding gasket as claimed in claim 8, wherein said first and second seals are comprised of fluorocarbon rubber.

* * * * *